US008930906B2

(12) United States Patent
Carter et al.

(10) Patent No.: US 8,930,906 B2
(45) Date of Patent: Jan. 6, 2015

(54) SELECTIVELY ALLOWING CHANGES TO A SYSTEM

(75) Inventors: Bernadette A. Carter, Raleigh, NC (US); Al Chakra, Apex, NC (US); Lori D. Landesman, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/534,701

(22) Filed: Jun. 27, 2012

(65) Prior Publication Data

US 2014/0006768 A1 Jan. 2, 2014

(51) Int. Cl.
G06F 7/00 (2006.01)
G06F 17/00 (2006.01)
G06F 1/24 (2006.01)
G06F 9/00 (2006.01)
G06F 11/00 (2006.01)
G06F 9/44 (2006.01)

(52) U.S. Cl.
USPC ............ 717/122; 707/609; 713/100; 714/33; 717/101; 717/120; 717/124; 717/126; 717/127; 717/130; 717/132; 717/168

(58) Field of Classification Search
CPC .............. G06F 8/20; G06F 8/70; G06F 8/71; G06F 8/451; G06F 8/456; G06F 9/44; G06F 9/505; G06F 9/5038; G06F 9/5072; G06F 9/44536; G06F 11/3604; G06F 11/3616; G06F 11/3676; G06F 11/3688; G06F 11/3692; G06F 8/75; G06F 8/77; G06F 2201/81; G06F 2201/865
See application file for complete search history.

(56) References Cited

U.S. PATENT DOCUMENTS

| 6,219,805 | B1 * | 4/2001 | Jones et al. ................ 714/33 |
| 6,662,357 | B1 * | 12/2003 | Bowman-Amuah ......... 717/120 |
| 7,131,071 | B2 | 10/2006 | Gune et al. |
| 8,566,391 | B2 * | 10/2013 | Saito et al. ................ 709/203 |
| 2006/0161879 | A1 * | 7/2006 | Lubrecht et al. ........... 717/101 |
| 2007/0006122 | A1 * | 1/2007 | Bailey et al. ............... 717/101 |

(Continued)

OTHER PUBLICATIONS

Thomas Setzer et al., Decision Support for Service Transition Management, 2008 IEEE, [Retrieved on Nov. 26, 2013]. Retrieved from the internet: <URL: http://ieeexplore.ieee.org/stamp/stamp.jsp?tp=&arnumber=4575135> 8 Pages (200-207).*

(Continued)

*Primary Examiner* — Don Wong
*Assistant Examiner* — Anibal Rivera
(74) *Attorney, Agent, or Firm* — Cuenot, Forsythe & Kim, LLC (57) ABSTRACT

Identify a first change to a first portion of the system, and identifying at least a second portion of the system that is, at least in part, dependent on the first portion. At least one user who is assigned responsibility for maintaining the first portion or the second portion of the system can be identified, and an availability of the user to maintain the first portion or the second portion of the system during a time period can be determined. The time period can begin when the first change is initially scheduled for introduction into the system. Responsive to determining that the user is not sufficiently available to maintain the first portion or the second portion of the system during the time period, the first change can be prevented from being introduced into the system as initially scheduled for introduction into the system.

20 Claims, 3 Drawing Sheets

(56) References Cited

U.S. PATENT DOCUMENTS

| | | | |
|---|---|---|---|
| 2007/0006152 A1* | 1/2007 | Ahmed et al. | 717/122 |
| 2007/0100712 A1 | 5/2007 | Kilpatrick et al. | |
| 2008/0046876 A1* | 2/2008 | Clemm et al. | 717/168 |
| 2008/0127089 A1* | 5/2008 | Peretz et al. | 717/122 |
| 2008/0183873 A1 | 7/2008 | Banavar et al. | |
| 2008/0216056 A1* | 9/2008 | Bate et al. | 717/127 |
| 2008/0235663 A1* | 9/2008 | Volkmer | 717/120 |
| 2008/0244536 A1* | 10/2008 | Farchi et al. | 717/130 |
| 2009/0144698 A1* | 6/2009 | Fanning et al. | 717/120 |
| 2009/0235232 A1* | 9/2009 | Malik et al. | 717/120 |
| 2010/0191952 A1* | 7/2010 | Keinan | 713/100 |
| 2011/0041120 A1* | 2/2011 | Nagappan et al. | 717/126 |
| 2011/0214106 A1* | 9/2011 | Qi et al. | 717/124 |
| 2011/0283270 A1* | 11/2011 | Gass et al. | 717/168 |
| 2012/0017195 A1* | 1/2012 | Kaulgud et al. | 717/101 |
| 2012/0167060 A1* | 6/2012 | Landwehr et al. | 717/132 |
| 2013/0204837 A1* | 8/2013 | Sabharwal, Navin | 707/609 |

OTHER PUBLICATIONS

"Dependency Structure Matrix," [online] NDepend v4, SMACCHIA.com S.A.R.L. © 2004-2012, [retrieved Jun. 26, 2012] retrieved from the Internet: <http://www.ndepend.com/Doc_Matrix.aspx>, 9 pgs.

Duchrow, M., "Programmer's Friend—Class Dependency Analyzer (CDA)," [online] www.Dependency-Analyzer.org, May 16, 2010, retrieved from the Internet: <http://www.dependency-analyzer.org/>.

"Rational TestManager," [online] IBM Corporation [retrieved Jun. 27, 2012] retrieved from the Internet: <http://www-01.ibm.com/software/awdtools/test/manager/>, 3 pgs.

* cited by examiner

SELECTIVELY ALLOWING CHANGES TO A SYSTEM

BACKGROUND

Arrangements described herein relate to managing changes to a system.

Version control systems commonly are used to manage changes to a system, such as files, documents, computer programs, and other collections of information. Changes are usually identified by a number or letter code, such as "version number" or "revision number." For example, an initial set of files may be identified as "version 1." When a first change is made, the resulting set can be identified as "version 2," and so on. Each version typically is associated with a timestamp and an identifier associated with the person making the change. Versions of the files can be compared, restored and, with some types of files, merged.

BRIEF SUMMARY

One or more embodiments disclosed within this specification relate to selectively allowing changes to a system.

An embodiment can include a method of managing changes to a system. The method can include identifying a first change to a first portion of the system and, via a processor, identifying at least a second portion of the system that is, at least in part, dependent on the first portion. The method further can include identifying at least one user who is assigned responsibility for maintaining the first portion or the second portion of the system, and determining an availability of the user to maintain the first portion or the second portion of the system during a time period beginning when the first change is initially scheduled for introduction into the system. Responsive to determining that the user is not sufficiently available to maintain the first portion or the second portion of the system during the time period, the first change can be prevented from being introduced into the system as initially scheduled for introduction into the system.

Another embodiment can include a data processing system. The data processing system includes a processor configured to initiate executable operations including identifying a first change to a first portion of the system, and identifying at least a second portion of the system that is, at least in part, dependent on the first portion. At least one user who is assigned responsibility for maintaining the first portion or the second portion of the system can be identified, and an availability of the user to maintain the first portion or the second portion of the system during a time period can be determined. The time period can begin when the first change is initially scheduled for introduction into the system. Responsive to determining that the user is not sufficiently available to maintain the first portion or the second portion of the system during the time period, the first change can be prevented from being introduced into the system as initially scheduled for introduction into the system.

Another embodiment can include a computer program product for managing changes to a system. The computer program product can include a computer-readable storage medium having stored thereon program code that, when executed, configures a processor to perform operations including identifying a first change to a first portion of the system, and identifying at least a second portion of the system that is, at least in part, dependent on the first portion. At least one user who is assigned responsibility for maintaining the first portion or the second portion of the system can be identified, and an availability of the user to maintain the first portion or the second portion of the system during a time period can be determined. The time period can begin when the first change is initially scheduled for introduction into the system. Responsive to determining that the user is not sufficiently available to maintain the first portion or the second portion of the system during the time period, the first change can be prevented from being introduced into the system as initially scheduled for introduction into the system.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with the embodiments described herein, when changes are made to portions of a system, such changes can be identified, and the potential impact of the changes in the system can be evaluated to determine whether the changes may be introduced into the system when initially scheduled, introduced into the system at a later time, or not introduced at all. For example, when a user makes critical changes to a first portion of the system (e.g., a file, a document or program code) before leaving for vacation, these changes may tend to have negative repercussions due to the user not being available to explain the changes or fix unforeseen problems caused by the changes. Moreover, users who maintain other portions of the system that depend on the changed portion may not be readily available to implement changes in the other portions necessitated by the initial changes. While the initial changes may have been valid, the repercussions of the changes may be disastrous if users who are responsible for making the necessary secondary level changes are not available. For example, the initial changes may induce other changes to be required for other portions of the system, such as various attributes that may need attention from various users in response to the initial changes. Consequently, the system may be in an invalid state until all interested parties are available. The arrangements described herein mitigate the risk of such a scenario occurring.

As used herein, to introduce a change into a system means to activate the change in the system. For example, a change can be made to an inactive copy of a file or document, but that change is not active in the system until the change is introduced into the system.

Figure 1:
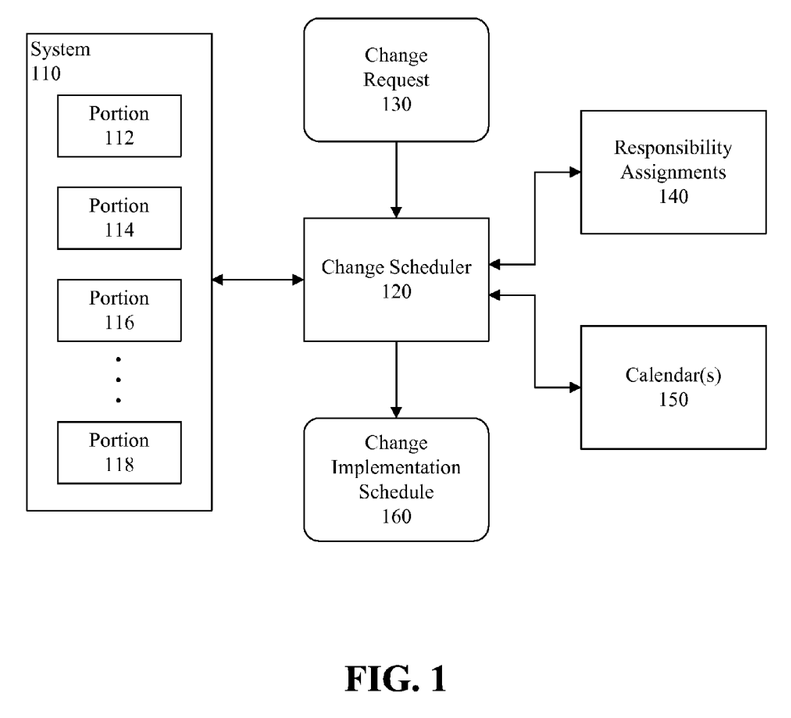
FIG. 1 is a block diagram illustrating a system for managing changes to another system in accordance with one embodiment disclosed within this specification.

FIG. 1 is a block diagram illustrating a system 100 for managing changes to another system 110 in accordance with one embodiment disclosed within this specification. The system 110 can be an application (e.g., a computer program), a collection of applications, a collection of files, a collection of documents, a collection of files, a collection of applications, files and/or documents, or the like. In this regard, the system 110 can include various portions 112, 114, 116, 118. A portion 112-118 of the system 110 can be a particular application, a particular file, a particular document, or a portion of a particular application, a particular file or a particular document.

Within the system 110 various portions 112-118 may be dependent on other portions 112-118. For example, the portions 114-116 can be dependent on the portion 112. As described herein, a particular portion of the system 110 is dependent on another portion of the system 110 if the particular portion relies on the other portion when the system 110 is executed or otherwise exercised. In illustration, in the case that the portions 112-118 comprise computer-program code, if the portion 114 calls a function, initiates a routine, or references an object defined and/or modified by the portion 112, the portion 114 can be considered to be dependent on the portion 112. In the case that the portions 112-118 are files, if the portion 112 is required to process the portion 114, or the portion 114 references the portion 112, the portion 114 can be considered to be dependent on the portion 112. In the case that the portions 112-118 are documents, if the portion 114 references the portion 112, or the portion 112 is embedded in the portion 114, the portion 114 can be considered to be dependent on the portion 112.

The system 100 can include a change scheduler 120 configured to schedule changes to the system 110. The change scheduler can receive a change request 130, for example from a user, such as a computer programmer, or from an automated process. The change request 130 can indicate changes to be made to one or more portions 112-118 of the system 110. For example, the change request can comprise a revised version for each of the portions 112-118 to be changed, and each revised version can include the requested changes. Optionally, the change request 130 can identify an initial schedule indicating when it is desired for the changes to be introduced into the system 110. If the change request 130 does not indicate an initial schedule, then the change scheduler 120 can assume a default schedule as the initial schedule. The default schedule can indicate that the changes are requested to be introduced immediately (e.g., in real time when the change request 130 is received), at a next scheduled update of the system 110, or when the changes are approved by one or more other users or administrators.

By way of example, the change request 130 can indicate changes to be made to portions 112 and 114 of the system 110. Of course, the change request 130 can request any number of other changes to any number of other portions 114-116. In response to receiving the change request 130, the change scheduler 120 can assign a risk value to the changes. In illustration, to determine the risk value for a change to the portion 112, the change scheduler 120 can identify one or more circumstances related to the change, and assign a risk value to each circumstance. The change scheduler 120 can sum the individual circumstance risk values to determine an overall risk value assigned to the change.

Individual circumstances can pertain to a number of other portions 114-118 of the system 110 that, at least in part, are dependent on the portion 112, a nature of the change (e.g., whether the change is to syntax of computer program code and the type of the syntax changed, whether the changes are to comments in computer program code, or the like), a number of lines of code that are modified (e.g., changed, added or deleted), a number of attributes in other portions 114-118 of the system 110 that are related to the portion 112, a number of words that are changed in a document, etc. Further, individual circumstances can pertain to whether the system 110 is a live application (e.g., a web site, a web application or a hosted application), a number or approximate number of end users of the live application, and whether the live application is mission critical.

If the changes are merely to comments in computer-program code, or minor changes to syntax (e.g., changing "if/then" syntax to "while/do" syntax) then the respective risk values for those circumstance can be low. If however, there are changes to syntax in numerous lines of code, the risk value can be higher. If a single portion 116 is dependent on the portion 112, the respective circumstance risk value can be lower than if many portions of the system 110 are dependent on the portion 112. Similarly, if the system 110 is a live application, the risk values for such circumstance can be lower if only a small number of end users use the live application and/or if the live application is not mission critical. If there are a large number of end users and/or the live application is mission critical, the risk values for those circumstances can be higher. The overall risk value for the change to the portion 114, or changes to any other portions of the system 110, can be determined in a similar manner.

For simplicity of explanation, the present example describes an example embodiment if changes are requested to the first portion 112, though those skilled in the art will appreciate that this process can be applied to changes to any other portions of the system 110. If the overall risk value for the change to the portion 112 is not greater than a threshold value, the change scheduler 120 can schedule the change to the portion 112 to be introduced in the system 110 as initially scheduled. If the overall risk value for the change to the portion 112 is greater than the threshold value, then further processing can be implemented to determine whether to allow such change as requested. The risk value assigned to the change to the portion 114 can be evaluated in a similar manner to determine whether to implement the change as initially scheduled. In this regard, if the change to the portion 112 has an overall risk value greater than the threshold value, but the change to the portion 114 has an overall risk value not greater than the threshold value, the change to the portion 114 can be scheduled for introduction into the system as initially scheduled without further scrutiny, while the change to the portion 112 can undergo additional scrutiny by the change scheduler 120.

In this example, assume that the change to the portion 112 is assigned a risk value higher than the threshold value, and that portions 116-118 depend, at least in part, on the portion 112. In this case, the change scheduler 120 can identify the other portions 116-118 and access a list of responsibility assignments 140 indicating one or more users who are responsible for maintaining the portions 116-118. A user submitting the change request 130 can be assumed to be responsible for maintaining the portion 112, though this need not be the case. For example, the change scheduler 120 also can access the list of responsibility assignments 140 to identify the user responsible for maintaining the portion 112. If any of the other portions 112, 116-118 do not have an assigned user responsible for maintaining them, the change scheduler 120 can generate an alert identifying such other portions and indicating that there is nobody assigned to maintain them. The alert can be communicated to the user who communicated the change request 130, an administrator or a team of users/administrators, or indicated in any other suitable manner.

Further, the change scheduler 120 can access one or more calendars 150 to determine the availability of users to maintain (e.g., change/update) the portions 116-118 and the availability of the user responsible for maintaining the portion 112. In one arrangement, a personal electronic calendar 150 can be associated with each user, for example within a collaborative software product or email client. In another arrangement, the calendar 150 can be a master electronic calendar for a plurality of users, for example within a personnel management system.

The calendar(s) 150 can indicate when the users tasked with maintaining the portions 112, 114, 118 are available to respond to any issues that may arise when the change to the portion 112 is introduced into the system 110. For example, the calendar(s) 150 can indicate when users are scheduled to be in the office and when the users are scheduled to be on vacation or otherwise unavailable for maintaining the respective portions 112, 114, 118. Based on this information, the change scheduler 120 can determine the availability of the various users to maintain their respective portions 112, 116, 118 of the system for a time period beginning when the change to the portion 112 is initially scheduled for introduction into the system. For example, if the change request 130 indicates that the change is to be introduced immediately, the change scheduler 120 can determine whether each of the users are immediately available and available for a next number of hours, days, weeks, etc. In one arrangement, the duration of the time period can be determined based on the magnitude of the changes. For example, the time period can be longer if a large number of lines of code are changed in comparison to if a small number of lines of code are changed.

If there is at least one user available to maintain each of the portions 112, 116, 118 during the time period, the change can be introduced in accordance with the initial schedule indicated by the change request 130 (or an assumed initial schedule if the change request 130 does not indicate a schedule). If, however, there is not at least one user sufficiently available to maintain the portions 112, 116, 118 during the time period, the change scheduler 120 can prevent the change to the portion 112 from being introduced into the system 110 as initially scheduled.

In the case that the change is not introduced into the system 110 as initially scheduled, the change scheduler 120 can identify an appropriate time period when at least one user will be available to maintain each of the portions 112, 116, 118, and schedule the change to the portion 112 to be introduced in that time period, for example at the beginning of the time period or at a next scheduled update that occurs during the time period. Further, the change scheduler 120 can update the calendar(s) 150 to indicate to the users when the update will occur and notify to the users that they need to be available to maintain their respective portions 112, 116, 118 of the system 110 if any changes and/or updates to these portions are required. Also, one or more alerts can be communicated to such users and/or to one or more administrators indicating this information. In addition, the change scheduler 120 can output a change implementation schedule 160 for the change to the portion 112 to schedule the change at the appropriate time. As used herein, "outputting" and/or "output" can mean storing in memory elements, for example, writing to a file stored in memory elements, writing to display or other peripheral output device, sending or transmitting to another system, exporting, or the like.

In one embodiment, the change scheduler 120 can automatically introduce the requested change at the newly scheduled time. In another embodiment, the change scheduler 120 can queue the change to be introduced at the scheduled time, but rather than automatically introducing the change, prompting one or more users and/or administrators to review the change. One or more of such users/administrators can generate a request to introduce the change, for example after review. Responsive to receiving such request, the change scheduler 120 can introduce the change.

Figure 2:
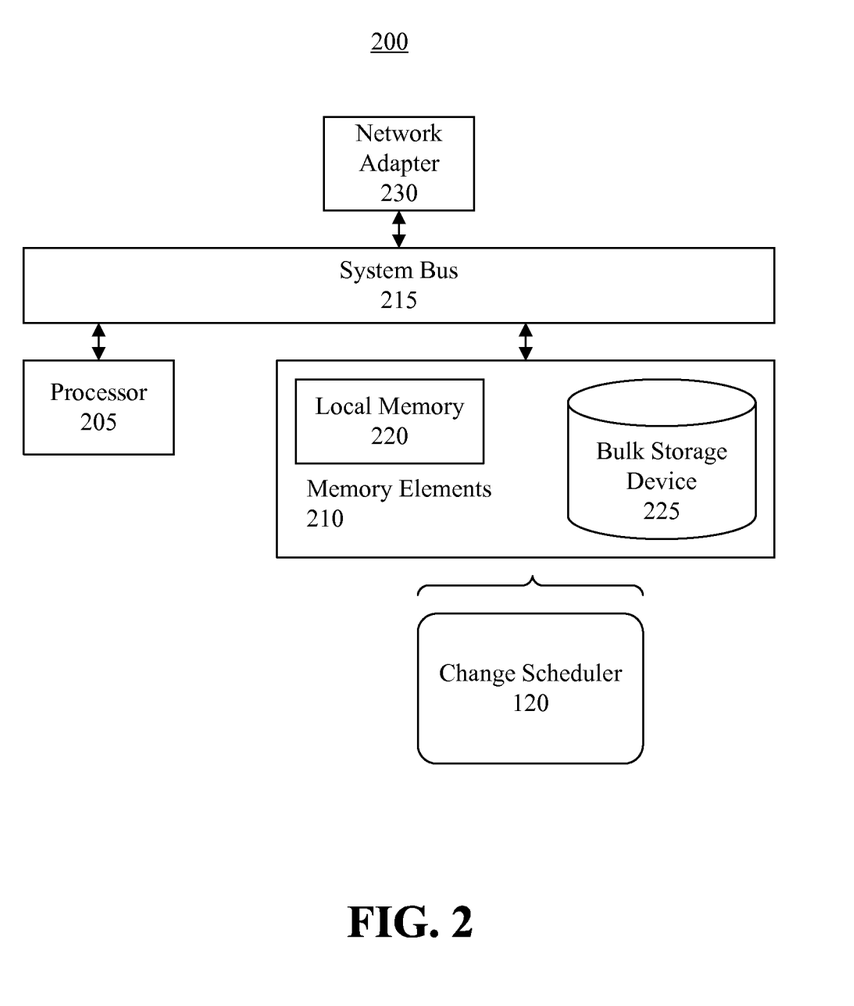
FIG. 2 is a block diagram illustrating a data processing system for managing changes to a system in accordance with another embodiment disclosed within this specification.

FIG. 2 is a block diagram illustrating a data processing system 200 (hereinafter "system 200") for managing changes to a system in accordance with another embodiment disclosed within this specification. The system 200 can include at least one processor 205 coupled to memory elements 210 through a system bus 215 or other suitable circuitry. As such, the system 200 can store program code within the memory elements 210. The processor 205 can execute the program code accessed from the memory elements 210 via the system bus 215. In one aspect, for example, system 200 can be implemented as a computer that is suitable for storing and/or executing program code. It should be appreciated, however, that the system 200 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The system 200 also can include one or more cache memories (not shown) that provide temporary storage of at least some program code in order to reduce the number of times program code must be retrieved from the bulk storage device 225 during execution.

Input/output (I/O) devices such as a keyboard (not shown), a display (not shown), and a pointing device (not shown) optionally can be coupled to the system 200. The I/O devices can be coupled to the system 200 either directly or through intervening I/O controllers. One or more network adapters 230 also can be coupled to the system 200 to enable the system 200 to become coupled to other systems, computer systems, remote printers, and/or remote storage devices through intervening private or public networks. Modems, cable modems, and Ethernet cards are examples of different types of network adapters 230 that can be used with the system 200.

As pictured in FIG. 2, the memory elements 210 can store the change scheduler 120. The change scheduler 120, being implemented in the form of executable program code, can be executed by the system 200 and, as such, can be considered part of system 200. The change scheduler 120 can be executed by the processor 205 to perform the functions and processes described in FIG. 1. The responsibility assignments 140 and calendar(s) 150 depicted in FIG. 1 also can be stored in the memory elements 210, or accessed from one or more other systems via the network adapter 230.

Figure 3:
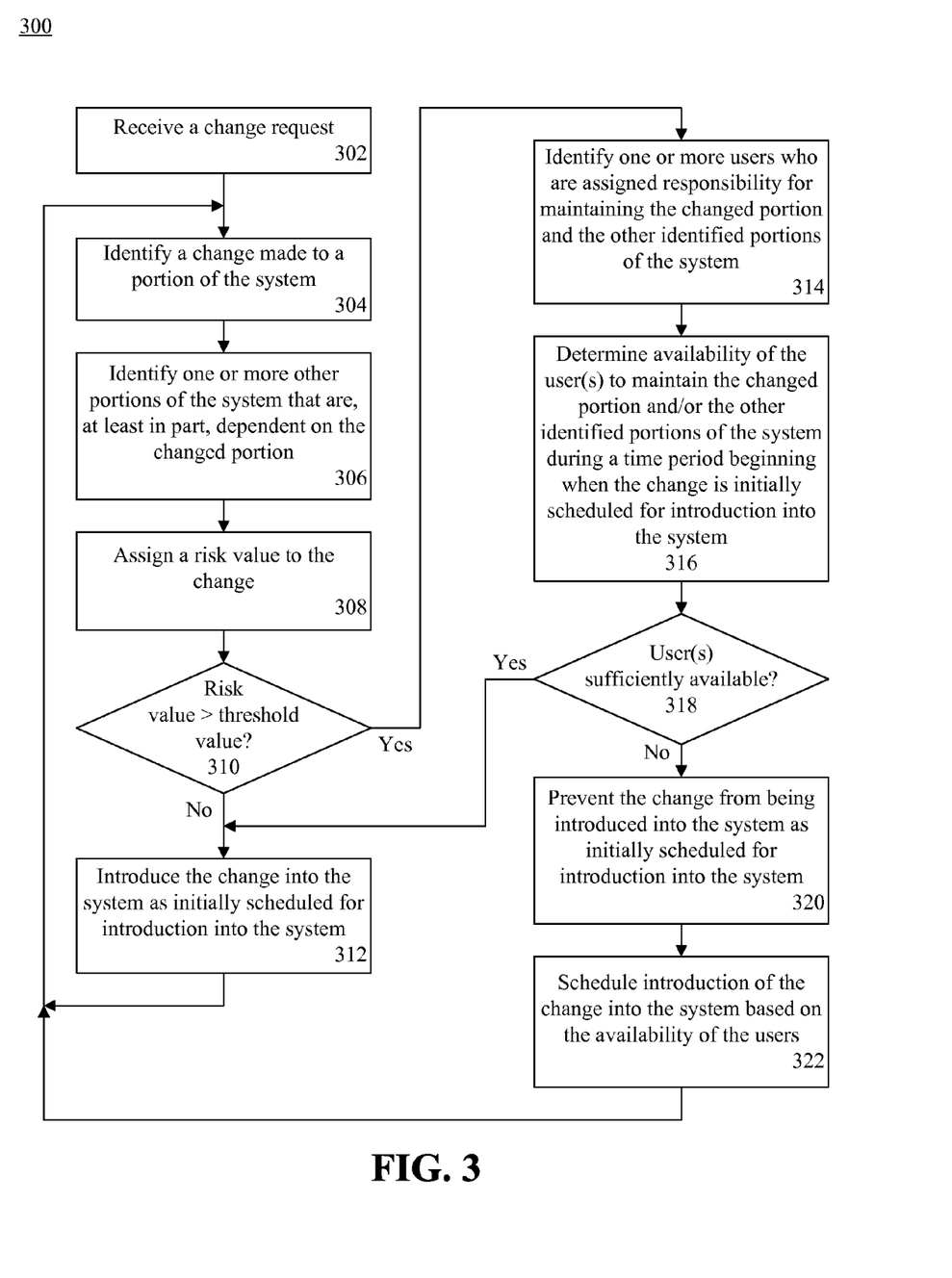
FIG. 3 is a flow chart illustrating a method of managing changes to a system in accordance with another embodiment disclosed within this specification.

FIG. 3 is a flow chart illustrating a method 300 of managing changes to a system in accordance with another embodiment disclosed within this specification. At step 302, a change request can be received. The change request can indicate one or more changes to the system. At step 304, a change to a portion of the system can be identified based on the change request. At step 306, one or more other portions of the system that are, at least in part, dependent on the changed portion can be identified. At step 308, a risk value can be assigned to the change. As noted, the risk value can be an overall risk value that is a sum of a plurality of circumstance risk values, each of which is assigned to a respective circumstance related to the change.

Referring to decision box 310, if the risk value is not greater than a threshold value, at step 312 the change can be introduced into the system as initially scheduled. As noted, the initial schedule can be indicated by the change request, or a can be a default schedule. The process then can return to step 304, where a next change to another portion of the system can be identified, and the process can continue.

If, however, the risk value is greater than the threshold value, at step 314 one or more users who are assigned responsibility for maintaining the changed portion and the other identified portions of the system can be identified. A user submitting the change request can be assumed to be responsible for maintaining the change portion, though this need not be the case. At step 316 the availability of the users to maintain the changed portion and/or the other portions of the system during a time period can be determined. The time period can begin when the change is initially scheduled for introduction into the system. For example, if the change is scheduled to begin at a particular time, the time period can begin at that time.

Referring to decision box 318, if there is at least one user sufficiently available to maintain the changed portion and the other identified portions of the system, the process can proceed to step 312 and the change can be introduced into the system as initially scheduled for introduction into the system. If, however, there are not users sufficiently available to maintain the changed portion and/or the other portions of the system during the time period, at step 320 the change can be prevented from being introduced into the system as initially scheduled for introduction into the system. At step 322, introduction of the change into the system can be scheduled based on the availability of the users. The process then can return to step 304 and continue until no further changes are identified.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "user" means a person (i.e., a "human being"). A user can be, for example, a computer programmer or an administrator.

As used herein, the term "real time" means a level of processing responsiveness that a user or system senses as sufficiently immediate for a particular process or determination to be made, or that enables the processor to keep up with some external process.

As used herein, ordinal terms (e.g. first, second, third, fourth, and so on) distinguish one user, file, portion of a file, change to a file or portion of a file, or the like from another user, file, portion of a file, change to a file or portion of a file, or the like. Thus, an ordinal term used herein need not indicate a specific position in an ordinal series. For example, a change identified as a "second change" may occur before a "first change." Moreover, one or more changes may occur between a first change and a second change.

Reference throughout this specification to "one embodiment," "an embodiment," "one arrangement," "an arrangement," or similar language means that a particular feature, structure, or characteristic described in connection with the embodiment or arrangement is included in at least one embodiment disclosed within this specification. Thus, appearances of the phrases "in one embodiment," "in an embodiment," "one arrangement," "an arrangement," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of managing changes to a system, the method comprising:
    identifying a first change to a first portion of the system;
    assigning a first risk value to the first change;
    determining whether the first risk value is greater than a threshold value;
    via a processor, identifying at least a second portion of the system that is, at least in part, dependent on the first portion;
    identifying at least one user who is assigned responsibility for maintaining the first portion or the second portion of the system, and determining an availability of the user to maintain the first portion or the second portion of the system during a time period beginning when the first change is initially scheduled for introduction into the system;
    responsive to determining that the first risk value is greater than the threshold value and determining that the user is not sufficiently available to maintain the first portion or the second portion of the system during the time period, preventing the first change from being introduced into the system as initially scheduled for introduction into the system;
    identifying a second change made to a third portion of the system;
    assigning a second risk value to the second change;
    determining whether the second first risk value is greater than the threshold value; and
    responsive to determining that the second risk value is not greater than the threshold value, allowing the second change to be introduced into the system as initially scheduled for introduction into the system.

2. The method of claim 1, wherein assigning the first risk value to the first change comprises:
    determining a number of other portions of the system that, at least in part, are dependent on the first portion of the system.

3. The method of claim 1, wherein assigning the first risk value to the first change comprises:
   determining a number of lines of code that are modified by the first change; and
   assigning the first risk value based on the number of lines of code that are modified.

4. The method of claim 1, wherein assigning the first risk value to the first change comprises:
   determining whether the first portion or the second portion of the system are for a live application; and
   determining a number of end users that use the live application.

5. The method of claim 1, wherein preventing the first change from being introduced into the system as initially scheduled for introduction into the system comprises:
   determining when the user is sufficiently available to maintain the second portion; and
   queuing the first change to be made to the first portion of the system when the user is sufficiently available to maintain the second portion.

6. The method of claim 5, further comprising:
   prompting a review of the first change when the user is sufficiently available to maintain the first portion or the second portion; and
   responsive a request to implement the first change being received, introducing the first change into the system.

7. The method of claim 1, wherein assigning the first risk value to the first change comprises:
   identifying a type of syntax changed in the first portion of the system; and
   assigning the first risk value based on the type of syntax that is changed.

8. A data processing system comprising:
   a processor configured to initiate executable operations comprising:
   identifying a first change to a first portion of the system;
   assigning a first risk value to the first change;
   determining whether the first risk value is greater than a threshold value;
   identifying at least a second portion of the system that is, at least in part, dependent on the first portion;
   identifying at least one user who is assigned responsibility for maintaining the first portion or the second portion of the system, and determining an availability of the user to maintain the first portion or the second portion of the system during a time period beginning when the first change is initially scheduled for introduction into the system;
   responsive to determining that the first risk value is greater than the threshold value and determining that the user is not sufficiently available to maintain the first portion or the second portion of the system during the time period, preventing the first change from being introduced into the system as initially scheduled for introduction into the system;
   identifying a second change made to a third portion of the system;
   assigning a second risk value to the second change;
   determining whether second first risk value is greater than the threshold value; and
   responsive to determining that the second risk value is not greater than the threshold value, allowing the second change to be introduced into the system as initially scheduled for introduction into the system.

9. The data processing system of claim 8, wherein assigning the first risk value to the first change comprises:
   determining a number of other portions of the system that, at least in part, are dependent on the first portion of the system.

10. The data processing system of claim 8, wherein assigning the first risk value to the first change comprises:
    determining a number of lines of code that are modified by the first change; and
    assigning the first risk value based on the number of lines of code that are modified.

11. The data processing system of claim 8, wherein assigning the first risk value to the first change comprises:
    determining whether the first portion or the second portion of the system are for a live application; and
    determining a number of end users that use the live application.

12. The data processing system of claim 8, wherein preventing the first change from being introduced into the system as initially scheduled for introduction into the system comprises:
    determining when the user is sufficiently available to maintain the second portion; and
    queuing the first change to be made to the first portion of the system when the user is sufficiently available to maintain the second portion.

13. The data processing system of claim 12, wherein the processor further is configured to initiate executable operations comprising:
    prompting a review of the first change when the user is sufficiently available to maintain the first portion or the second portion; and
    responsive a request to implement the first change being received, introducing the first change into the system.

14. The data processing system of claim 8, wherein assigning the first risk value to the first change comprises:
    identifying a type of syntax changed in the first portion of the system; and
    assigning the first risk value based on the type of syntax that is changed.

15. A computer program product for managing changes to a system, the computer program product comprising:
    a computer-readable storage device, wherein the computer-readable storage device is not a transitory, propagating signal per se, having stored thereon program code that, when executed, configures a processor to perform executable operations comprising:
    identifying a first change to a first portion of the system;
    assigning a first risk value to the first change;
    determining whether the first risk value is greater than a threshold value;
    identifying at least a second portion of the system that is, at least in part, dependent on the first portion;
    identifying at least one user who is assigned responsibility for maintaining the first portion or the second portion of the system, and determining an availability of the user to maintain the first portion or the second portion of the system during a time period beginning when the first change is initially scheduled for introduction into the system; and
    responsive to determining that the first risk value is greater than the threshold value and determining that the user is not sufficiently available to maintain the first portion or the second portion of the system during the time period, preventing the first change from being introduced into the system as initially scheduled for introduction into the system;
    identifying a second change made to a third portion of the system;

assigning a second risk value to the second change;
determining whether the second first risk value is greater than the threshold value; and
responsive to determining that the second risk value is not greater than the threshold value, allowing the second change to be introduced into the system as initially scheduled for introduction into the system.

16. The computer program product of claim 15, wherein assigning the first risk value to the first change comprises:
determining a number of other portions of the system that, at least in part, are dependent on the first portion of the system.

17. The computer program product of claim 15, wherein assigning the first risk value to the first change comprises:
determining a number of lines of code that are modified by the first change; and
assigning the first risk value based on the number of lines of code that are modified.

18. The computer program product of claim 15, wherein assigning the first risk value to the first change comprises:
determining whether the first portion or the second portion of the system are for a live application; and
determining a number of end users that use the live application.

19. The computer program product of claim 15, wherein preventing the first change from being introduced into the system as initially scheduled for introduction into the system comprises:
determining when the user is sufficiently available to maintain the second portion; and
queuing the first change to be made to the first portion of the system when the user is sufficiently available to maintain the second portion.

20. The computer program product of claim 15, wherein assigning the first risk value to the first change comprises:
identifying a type of syntax changed in the first portion of the system; and
assigning the first risk value based on the type of syntax that is changed.

* * * * *